United States Patent
Hemphill

(10) Patent No.: US 10,630,138 B2
(45) Date of Patent: Apr. 21, 2020

(54) RECIPROCATING RAMP MOTOR

(71) Applicant: Schaeffler Technologies AG & Co. KG, Herzogenaurach (DE)

(72) Inventor: Jeffrey Hemphill, Copley, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 351 days.

(21) Appl. No.: 15/702,835

(22) Filed: Sep. 13, 2017

(65) Prior Publication Data

US 2019/0081534 A1   Mar. 14, 2019

(51) Int. Cl.
*H02K 7/075* (2006.01)
*H02K 33/14* (2006.01)
*H02K 7/06* (2006.01)

(52) U.S. Cl.
CPC .............. *H02K 7/075* (2013.01); *H02K 7/06* (2013.01); *H02K 33/14* (2013.01)

(58) Field of Classification Search
CPC .......... H02K 7/06; H02K 7/075; H02K 33/14
USPC ......................................................... 310/20
See application file for complete search history.

(56) References Cited

U.S. PATENT DOCUMENTS

| | | | |
|---|---|---|---|
| 1,745,503 A | 2/1930 | Parvin | |
| 3,293,515 A | 12/1966 | Klemm | |
| 3,643,117 A | 2/1972 | Alger et al. | |
| 4,012,675 A | 3/1977 | Schulze, Jr. | |
| 6,691,845 B2 * | 2/2004 | Showalter | F16D 25/02 192/35 |
| 8,344,560 B2 | 1/2013 | Gosvener | |
| 2001/0002546 A1 * | 6/2001 | Miyoshi | H02K 7/06 72/104 |
| 2005/0269887 A1 * | 12/2005 | Blanding | B64C 13/00 310/112 |
| 2007/0120432 A1 * | 5/2007 | Vaden | F01B 3/007 310/80 |
| 2007/0137329 A1 * | 6/2007 | Everson | F16D 1/05 74/89.23 |
| 2009/0091196 A1 * | 4/2009 | Cooper | H02K 7/075 310/24 |
| 2010/0300223 A1 * | 12/2010 | Farb | F03B 13/16 74/35 |
| 2011/0020155 A1 * | 1/2011 | Reukers | F04B 23/06 417/415 |

* cited by examiner

Primary Examiner — Gary A Nash

(57) ABSTRACT

A reciprocating ramp motor, including: an output shaft including an axis of rotation; a first electro-magnetic device including a first coil; an annular core plate disposed about the output shaft and axially off-set from the first electro-magnetic device in a first axial direction; a roller device; and a first ramp non-rotatably connected to the output shaft; and sloping in the first axial direction along a first circumferential direction. The first coil is arranged to be electrically energized to displace the annular core plate in a second axial direction, opposite the first axial direction. Displacement of the annular core plate in the second axial direction is arranged to roll the roller device along the first ramp in the second axial direction. Displacement of the roller device along the first ramp in the second axial direction is arranged to rotate the output shaft in the first circumferential direction.

20 Claims, 9 Drawing Sheets

RECIPROCATING RAMP MOTOR

TECHNICAL FIELD

The present disclosure relates to reciprocating ramp motor that transforms linear motion into rotational motion.

BACKGROUND

Electric motors are used for high-speed actuation and as traction motors in various applications. In both applications, reducing size, inertia, and cost are important. Substantial cost is also involved in the power electronics which drive the motor. Furthermore, it is normally required to build a mechanical ratio between the motor and the load in order to translate high motor speeds into useful work.

Known electric motors typically convert electromagnetic force into rotary motion. Some known electric motors use a crank shaft to translate linear core movement into rotation of a shaft. The preceding configuration limits a ratio between axial and rotary motion and also fixes the ratio. A further problem with known designs is the large number of solenoid coils used, which increases the complexity and cost of the motor and associated power electronics for the motor.

SUMMARY

According to aspects illustrated herein, there is provided a reciprocating ramp motor, including: an output shaft including an axis of rotation; a first electro-magnetic device; a first annular core plate disposed about the output shaft and axially off-set from the first electro-magnetic device; a first roller device; and a first ramp non-rotatably connected to the output shaft; and sloping in a first axial direction along a first circumferential direction. The first electro-magnetic device is arranged to be electrically energized at a first point in time to displace the first annular core plate in the first axial direction. Displacement of the first annular core plate in the first axial direction is arranged to roll the first roller device along the first ramp in the first axial direction to rotate the output shaft in a second circumferential direction, opposite the first circumferential direction.

According to aspects illustrated herein, there is provided a reciprocating ramp motor, including: an output shaft including an axis of rotation; a first electro-magnetic device including a first coil; a second electro-magnetic device including a second coil; an annular core plate disposed about the output shaft and axially disposed between the first and second electro-magnetic devices; a plurality of roller devices connected to the annular core plate; and first and second collars fixedly connected to the output shaft. The first collar includes a first plurality of ramps sloping in the first axial direction along a first circumferential direction and a second plurality of second ramps sloping in a second axial direction, opposite the first axial direction, along the first circumferential direction. The second collar includes a third plurality of ramps sloping in the second axial direction along the first circumferential direction and a fourth plurality of ramps sloping in the first axial direction along the first circumferential direction. The first coil is arranged to be electrically energized at a first point in time to displace the annular core plate in the first axial direction to: roll the plurality of roller devices along the first plurality of ramps in the first axial direction to rotate the output shaft in a second circumferential direction, opposite the first circumferential direction; or roll the plurality of roller devices along the second plurality of ramps in the first axial direction to rotate the output shaft in the first circumferential direction. The second coil is arranged to be electrically energized at a second point in time, different from the first point in time, to displace the annular core plate in the second axial direction to: roll the plurality of roller devices along the third plurality of ramps in the second axial direction to rotate the output shaft in the second circumferential direction; or roll the plurality of roller devices along the fourth plurality of ramps in the first axial direction to rotate the output shaft in the first circumferential direction.

According to aspects illustrated herein, there is provided a reciprocating ramp motor, including: an output shaft including an axis of rotation; a first electro-magnetic device; a second electro-magnetic device; a first annular core plate disposed about the output shaft; a second annular core plate disposed about the output shaft; a first plurality of roller devices connected to the first annular core plate; a second plurality of roller devices connected to the second annular core plate; a first collar fixedly connected to the output shaft and including a first plurality of ramps sloping in a first axial direction along a first circumferential direction and a second plurality of second ramps sloping in a second axial direction, opposite the first axial direction, along the first circumferential direction; and a second collar fixedly connected to the output shaft and including a third plurality of ramps sloping in the first axial direction along the first circumferential direction and a fourth plurality of ramps sloping in the second axial direction along the first circumferential direction. The first coil is arranged to be electrically energized at a first point in time to displace the first annular core plate in the first axial direction to: roll the first plurality of roller devices along the first plurality of ramps in the first axial direction to rotate the output shaft in a second circumferential direction, opposite the first circumferential direction; or roll the first plurality of roller devices along the second plurality of ramps in the first axial direction to rotate the output shaft in the first circumferential direction. The second coil is arranged to be electrically energized at a second point in time, different from the first point in time, to displace the second annular core plate in the first axial direction to: roll the second plurality of roller devices along the third plurality of ramps in the first axial direction to rotate the output shaft in the second circumferential direction; or roll the second plurality of roller devices along the fourth plurality of ramps in the first axial direction to rotate the output shaft in the first circumferential direction.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 9:
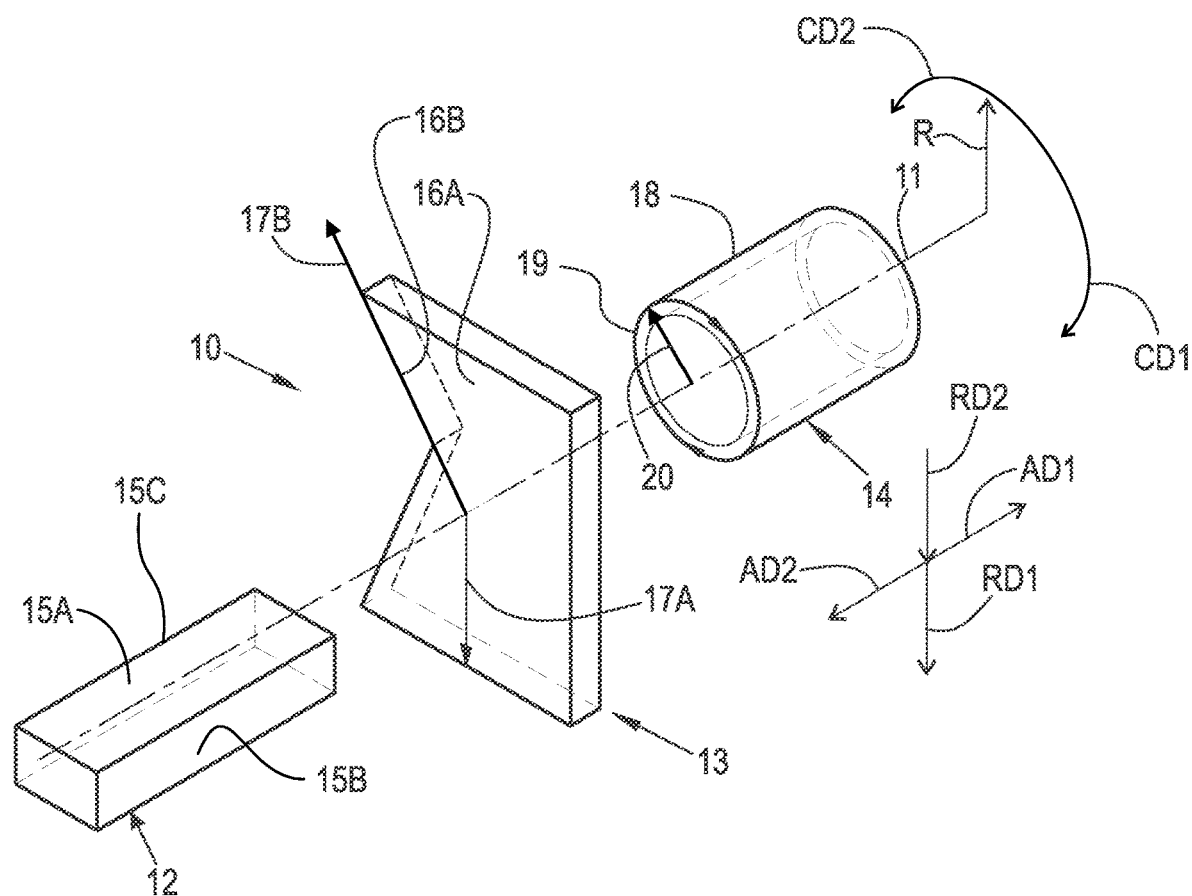

FIG. 9 is a perspective view of cylindrical coordinate system 10 demonstrating spatial terminology used in the present application. The present application is at least partially described within the context of a cylindrical coordinate system. System 10 includes axis of rotation, or longitudinal axis, 11, used as the reference for the directional and spatial terms that follow. Opposite axial directions AD1 and AD2 are parallel to axis 11. Radial direction RD1 is orthogonal to axis 11 and away from axis 11. Radial direction RD2 is orthogonal to axis 11 and toward axis 11. Opposite circumferential directions CD1 and CD2 are defined by an endpoint of a particular radius R (orthogonal to axis 11) rotated about axis 11, for example clockwise and counterclockwise, respectively.

To clarify the spatial terminology, objects 12, 13, and 14 are used. As an example, an axial surface, such as surface 15A of object 12, is formed by a plane co-planar with axis 11. However, any planar surface parallel to axis 11 is an axial surface. For example, surface 15B, parallel to axis 11 also is an axial surface. An axial edge is formed by an edge, such as edge 15C, parallel to axis 11. A radial surface, such as surface 16A of object 13, is formed by a plane orthogonal to axis 11 and co-planar with a radius, for example, radius 17A. A radial edge is co-linear with a radius of axis 11. For example, edge 16B is co-linear with radius 17B. Surface 18 of object 14 forms a circumferential, or cylindrical, surface. For example, circumference 19, defined by radius 20, passes through surface 18.

Axial movement is in direction axial direction AD1 or AD2. Radial movement is in radial direction RD1 or RD2. Circumferential, or rotational, movement is in circumferential direction CD1 or CD2. The adverbs "axially," "radially," and "circumferentially" refer to movement or orientation parallel to axis 11, orthogonal to axis 11, and about axis 11, respectively. For example, an axially disposed surface or edge extends in direction AD1, a radially disposed surface or edge extends in direction RD1, and a circumferentially disposed surface or edge extends in direction CD1.

Figure 1:
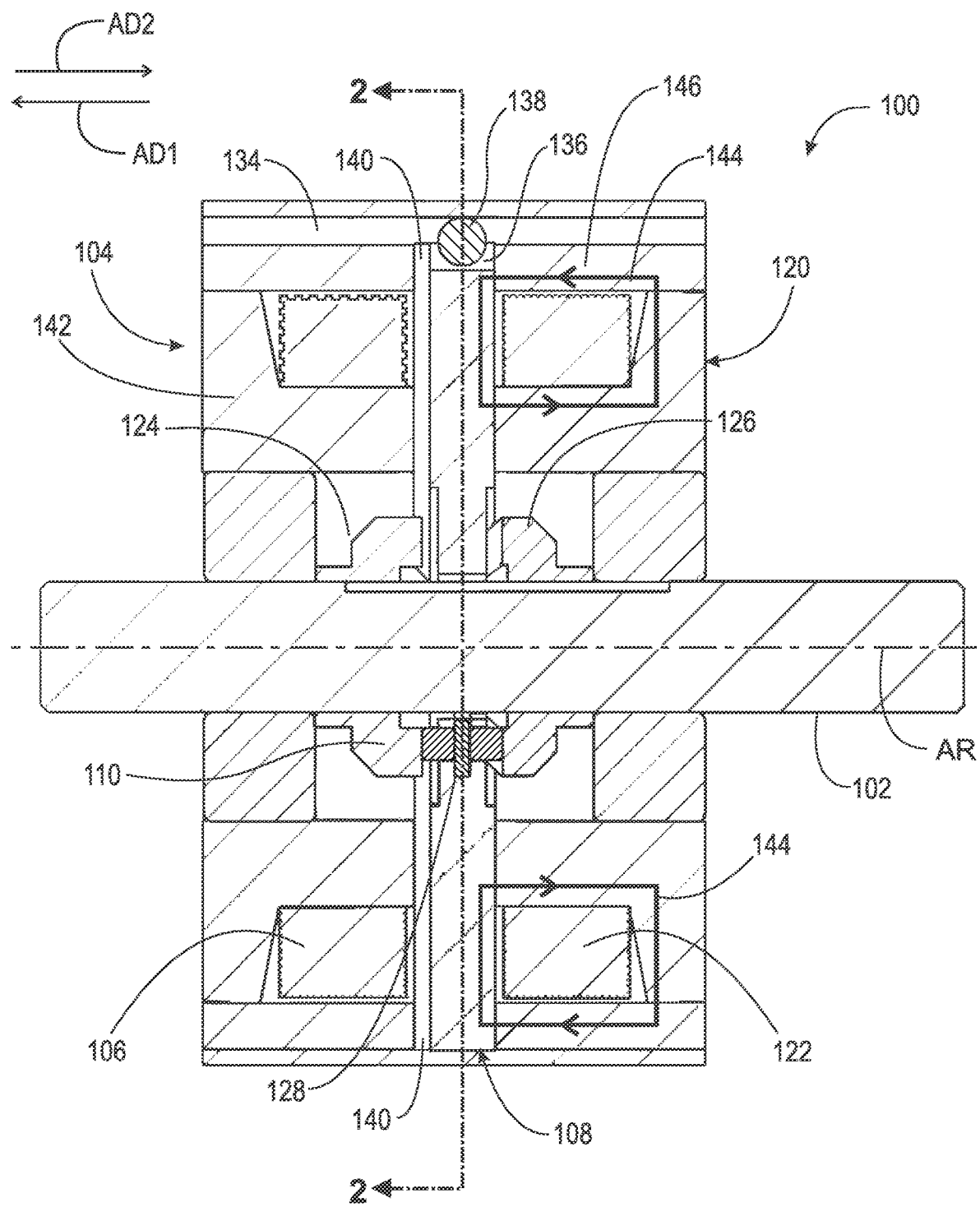
FIG. 1 is a cross-sectional view of a reciprocating ramp motor with a single core plate in a first position.

FIG. 1 is a cross-sectional view of reciprocating ramp motor 100 with a single annular core plate in a first position.

Figure 2:
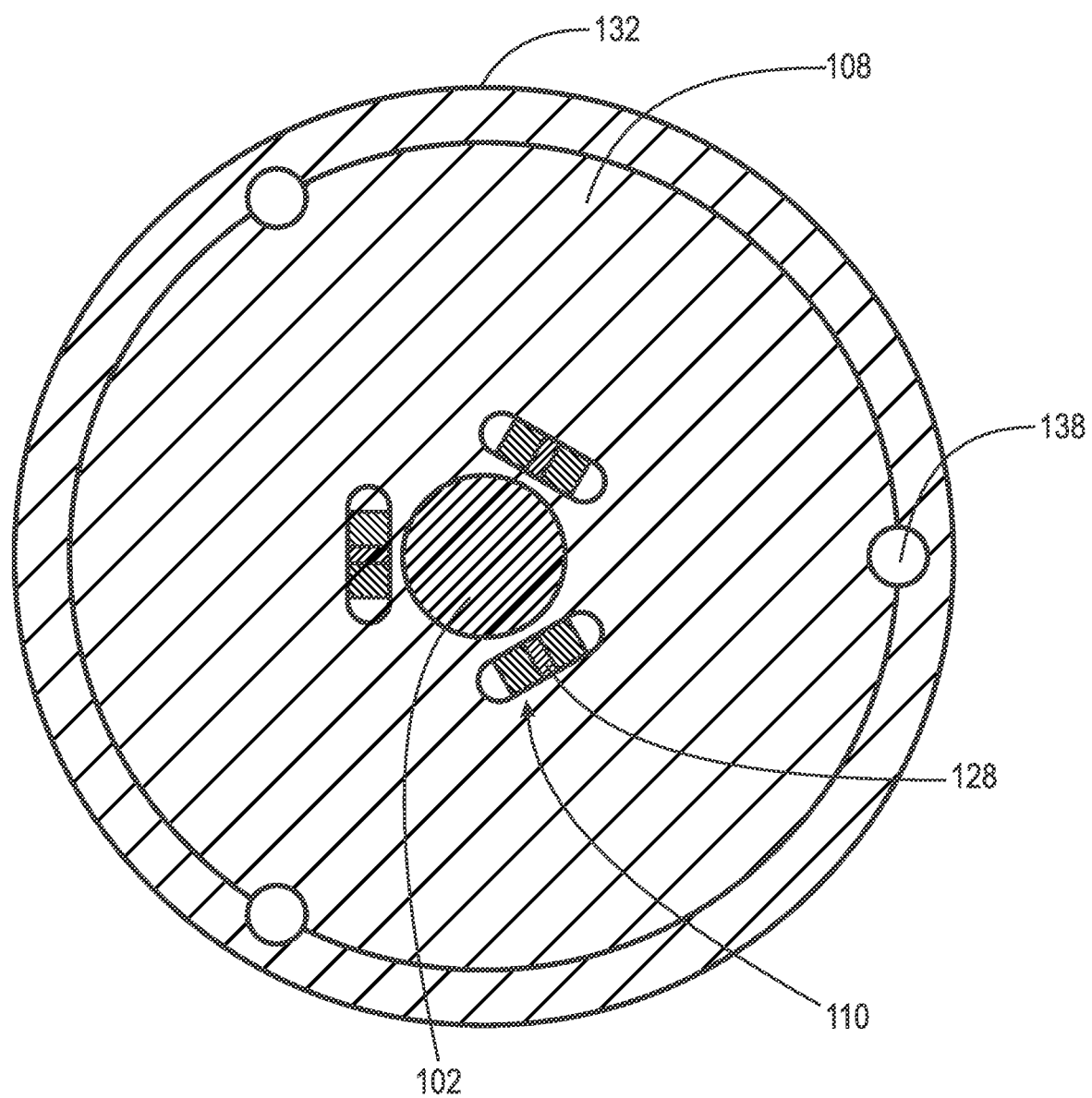
FIG. 2 is a cross-sectional view generally along line 2-2 in FIG. 1.

FIG. 2 is a cross-sectional view generally along line 2-2 in FIG. 1.

Figure 3:
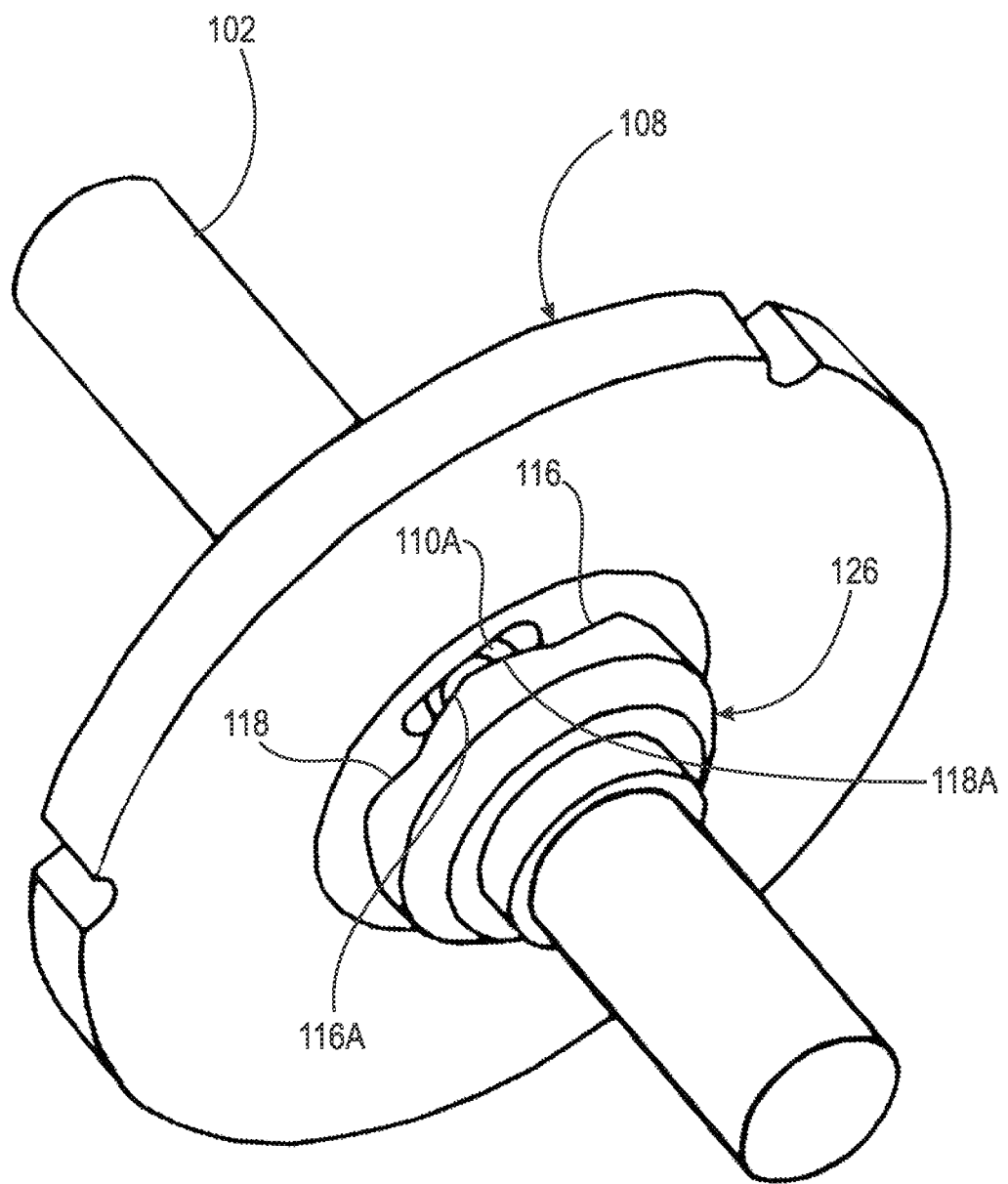
FIG. 3 is a perspective view of an output shaft, annular core ring, collar and rolling device for the motor in FIG. 1.

FIG. 3 is a perspective view of an output shaft, the annular core plate, a collar and a rolling device for motor 100 in FIG. 1.

Figure 4:
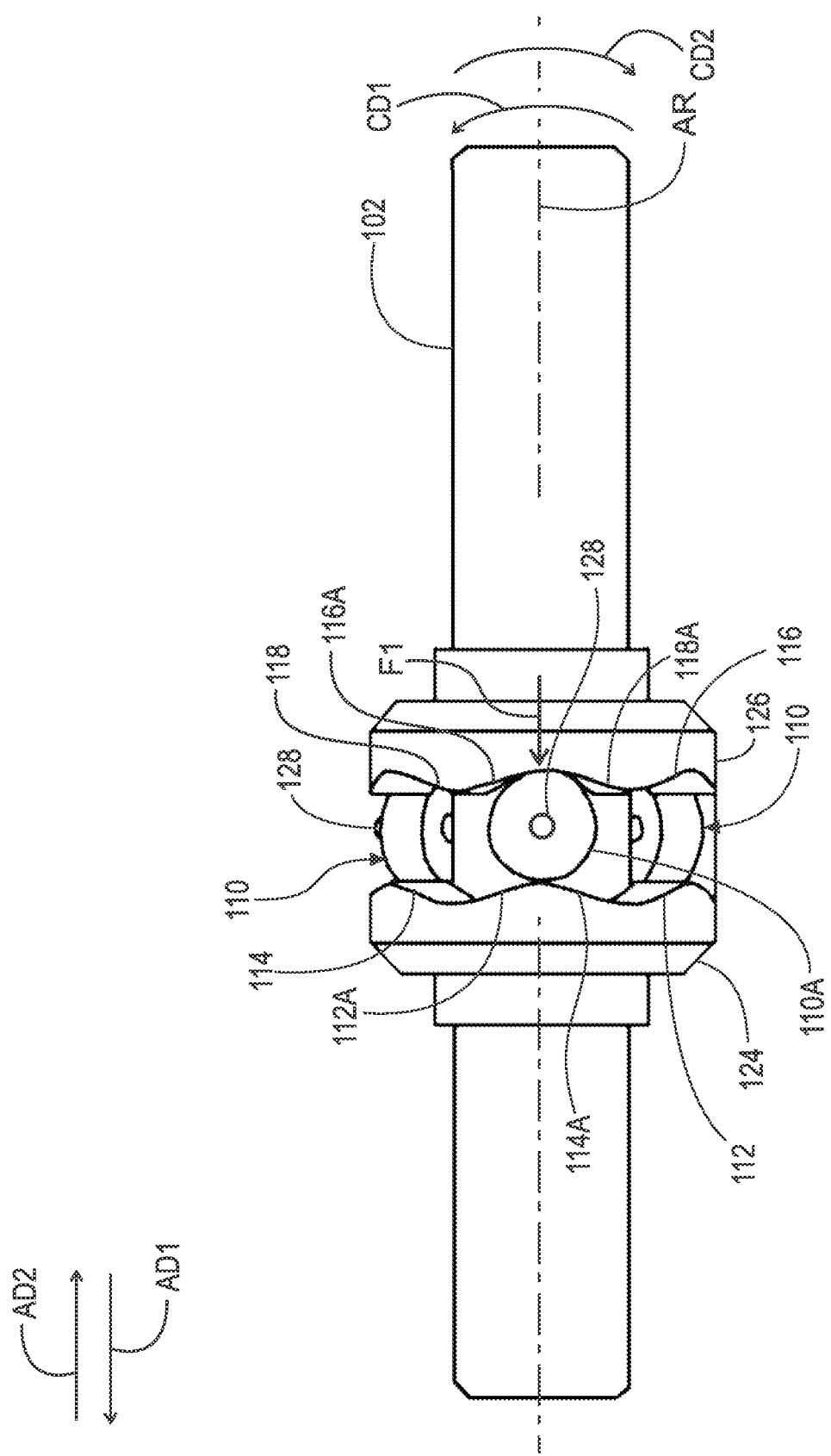
FIG. 4 is a side view of the output shaft, collars, and rolling devices in FIG. 1.

FIG. 4 is a side view of the output shaft, collars, and rolling devices in FIG. 1. The following should be viewed in light of FIGS. 1 through 4. Reciprocating ramp motor 100 includes: output shaft 102 with axis of rotation AR; electro-magnetic device 104. In an example embodiment, device 104 is a solenoid including coil 106. Motor 100 includes: annular core plate 108; roller devices 110; and ramps 112, 114, 116, and 118, each fixedly connected to the output shaft. By "fixedly connected" elements, we mean that: the elements are connected so that movement between the elements is not possible. Plate 108 is disposed about output shaft 102 and axially off-set from electro-magnetic device 104 in axial direction AD1.

Ramps 112 and 116 slope in axial direction AD1 along circumferential direction CD1. Ramps 114 slope and 118 in axial direction AD2 along circumferential direction CD1. Ramps 112 and 114 alternate in circumferential direction CD1. Ramps 116 and 118 alternate in circumferential direction CD1. A reference character "[digit][digit][digit][letter]" represents a specific example from a group of elements "[digit][digit][digit]." For example, ramp 112A is a specific example from ramps 112. For example, ramp 112A is a specific example from ramps 112. In an example embodiment, line L1, parallel to axis AR, passes through ramps 112 and 116, for example, through ramps 112A and 116A, without passing through ramps 114 or ramps 118. In an example embodiment, line L2, parallel to axis AR, passes through ramps 114 and 118, for example, through ramps 114A and 118A, without passing through ramps 112 or ramps 116. n an example embodiment, line L1, parallel to axis AR, passes through ramps 112 and 116, for example, through ramps 112A and 116A, without passing through ramps 114 or ramps 118. In an example embodiment, line L2, parallel to axis AR, passes through ramps 114 and 118, for example, through ramps 114A and 118A, without passing through ramps 112 or ramps 116.

Device 104 is arranged to be electrically energized to displace core plate 108 in axial direction AD1 from the position shown in FIG. 4. As further described below, displacement of core plate 108 in direction AD1 rolls roller devices 110 along respective ramps 112 or 114 in axial direction AD1. For example, device 110A rolls along ramp 112A in direction AD1 or device 110A rolls along ramp 114A in direction AD1. Displacement of roller devices 110 along ramps 112 in axial direction AD1 rotates output shaft 102 in circumferential direction CD2. Displacement of roller devices 110 along ramps 114 in axial direction AD1 rotates output shaft 102 in circumferential direction CD1. In an example embodiment: as shaft 102 rotates in direction CD2 and rollers 110 roll along ramps 112, rollers 110 also roll along ramps 116; and as shaft 102 rotates in direction CD1 rollers 110 roll along ramps 114, rollers 110 also roll along ramps 118.

Motor 100 includes electro-magnetic device 120. In an example embodiment, device 120 is a solenoid including coil 122. In an example embodiment, motor 100 includes collars 124 and 126 fixedly connected to shaft 102. Ramps 112 and 114 are formed by collar 124 and ramps 116 and 118 are formed by collar 126. Roller devices 110 are disposed between collars 124 and 126. Rollers 110 are connected to plate 108. In an example embodiment, each roller 110 is a cylindrical disc rotatable about a respective axle 128 fixedly connected to plate 108.

As an example of rotation of shaft 102 in direction CD2, displacement of plate 108 in direction AD1 imposes force F1 in direction AD1 on axles 128. To relieve force F1, rollers 110 roll along ramps 112. Because ramps 112 are sloped in direction AD1 along direction CD1, rolling rollers 110 along ramps 112 forces shaft 102 to rotate in direction CD2. As an example of rotation of shaft 102 in direction CD1, displacement of plate 108 in direction AD1, imposes force F1 in direction AD1 on axles 124. To relieve force F1, rollers 110 roll along ramps 114. Because ramps 114 are sloped in direction AD2 along direction CD1, rolling rollers 110 along ramps 114 forces shaft 102 to rotate in direction CD1.

Figure 5:
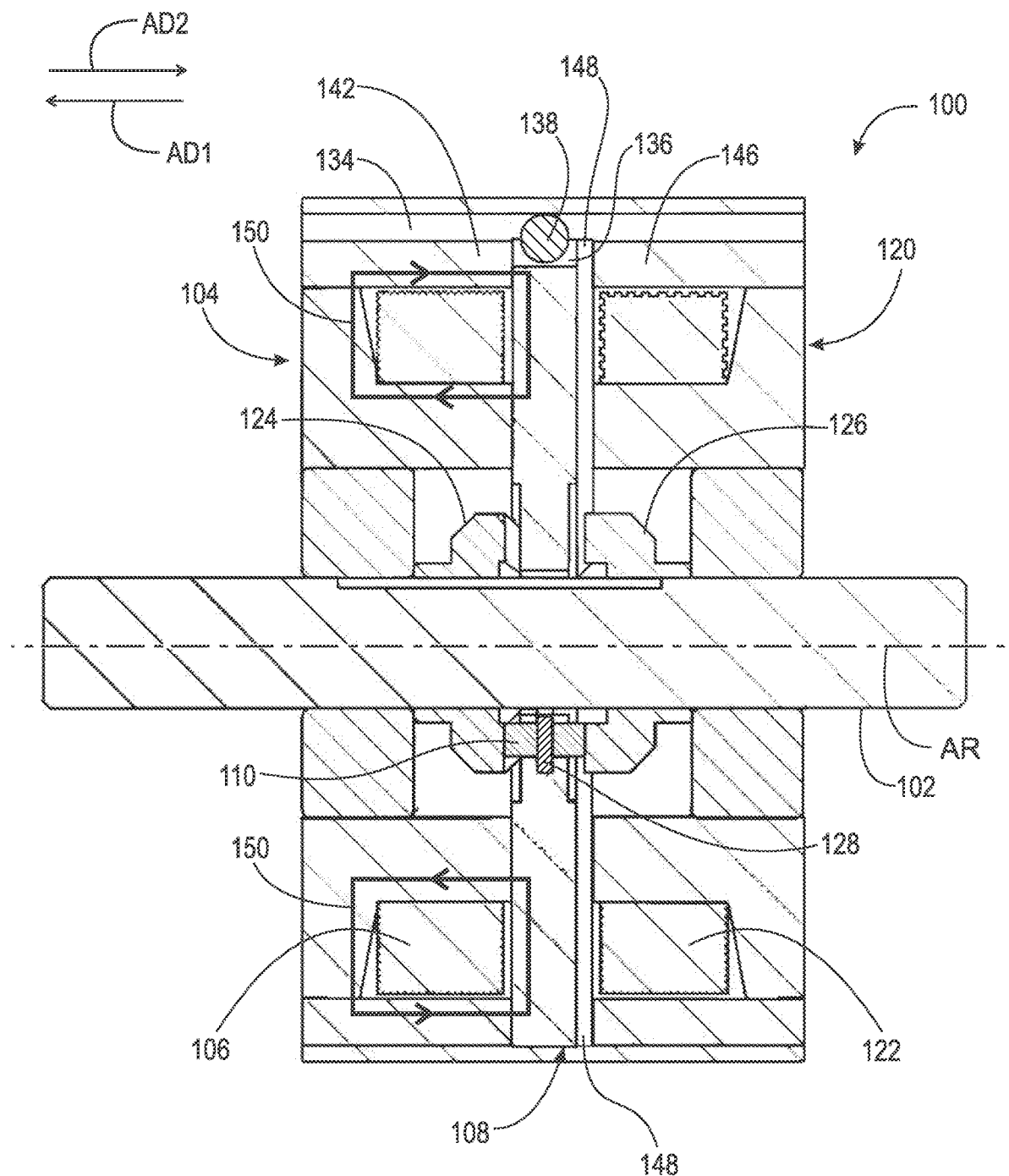
FIG. 5 is a cross-sectional view of the reciprocating ramp motor of FIG. 1 with the single core plate in a second position.

FIG. 5 is a cross-sectional view of reciprocating ramp motor 100 of FIG. 1 with single annular core plate 108 in a second position.

Figure 6:
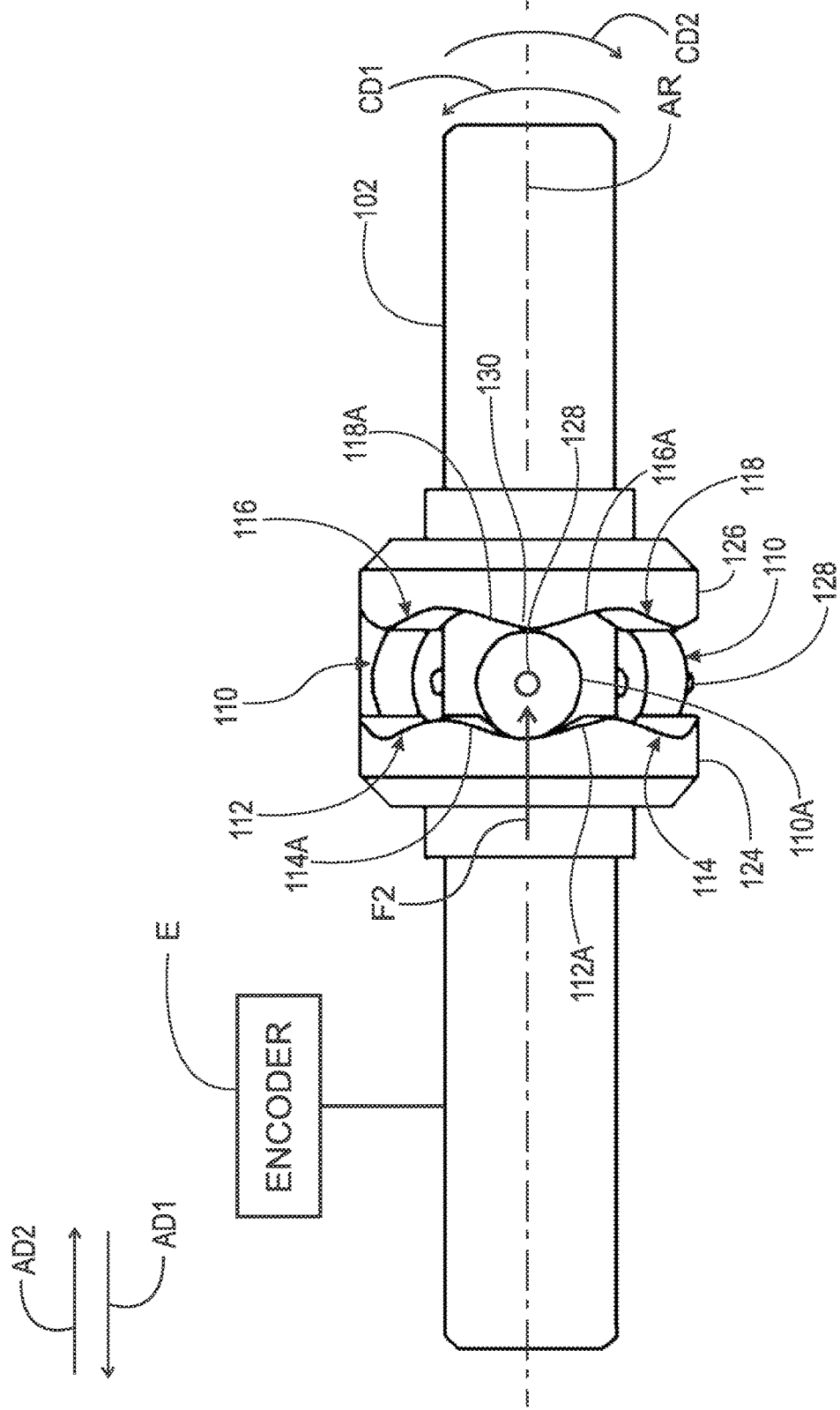
FIG. 6 is a side view of the output shaft, collars, and rolling devices in FIG. 5.

FIG. 6 is a side view of output shaft 102, collars 124 and 126, and rolling devices 110 in FIG. 5. The following should be viewed in light of FIGS. 1 through 6. In an example embodiment, displacement of plate 108 in direction AD1, from the position of plate 108 in FIG. 1, results in the configuration shown in FIGS. 5 and 6. Device 120 is arranged to be electrically energized to displace core plate 108 in axial direction AD2 from the position shown in FIGS. 5 and 6. As further described below, displacement of core plate 108 in direction AD2 rolls roller devices 110 along respective ramps 116 or 118 in direction AD2. For example, device 110A rolls along ramp 118A in direction AD2 or device 110A rolls along ramp 116A in direction AD2. Displacement of roller devices 110 along ramps 118 in axial direction AD2 rotates output shaft 102 in circumferential direction CD2. Displacement of roller devices 110 along ramps 116 in axial direction AD2 rotates output shaft 102 in circumferential direction CD1. In an example embodiment: as shaft 102 rotates in direction CD2 and rollers 110 roll along ramps 118, rollers 110 also roll along ramps 114; and as shaft 102 rotates in direction CD1 and rollers 110 roll along ramps 116, rollers 110 also roll along ramps 112.

As an example of rotation of shaft 102 in direction CD2, displacement of plate 108 in direction AD2, imposes force F2 in direction AD2 on axles 128. To relieve force F2, rollers 110 roll along ramps 118. Because ramps 118 are sloped in direction AD2 along direction CD1, rolling rollers 110 along ramps 118 forces shaft 102 to rotate in direction CD2. As an example of rotation of shaft 102 in direction CD1, displacement of plate 108 in direction AD2, imposes force F2 in direction AD2 on axles 128. To relieve force F2, rollers 110 roll along ramps 116. Because ramps 116 are sloped in direction AD1 along direction CD1, rolling rollers 110 along ramps 116 forces shaft 102 to rotate in direction CD1.

The following further describes the structure and operation of motor 100. Rollers 110 are in an indeterminate position in FIG. 4, for example, motor 100 is at rest. As an example, assume from the configuration of FIGS. 1 and 4, it is desired to rotate shaft 102 in direction CD2, which requires rolling rollers 110 along ramps 112. As an example strategy for initiating operation of motor 100 from the indeterminate position of FIG. 4, encoder E is connected to shaft 102 to measure position and rotation of shaft 102 and ramps 112, 114, 116, and 118 with respect to plate 108 and rollers 110. Device 104 is activated and rollers 110 will either roll along ramps 112 or ramps 114. If the encoder detects rotation of shaft 102 in direction CD2 (rollers 110 rolling on ramps 112), device 120 is activated at the proper time (for example as rollers 110 approach apexes 130 between ramps 112 and 114) to continue rotation of shaft 102 in direction CD2 by rolling rollers 110 along ramps 118. Momentum caused by rotation of shaft 102 in direction CD2 carries rollers 110 past respective apexes 130 and the indeterminate position shown in FIG. 4.

If the encoder detects rotation of shaft 102 in direction CD1 (rollers 110 rolling along ramps 114), device 120 is activated (for example before rollers 110 approach apexes 130 between ramps 112 and 114) to roll rollers along ramps 118 and reverse rotation of shaft 102 in direction CD1. Device 104 is activated at the proper time (for example as rollers 110 approach apexes 130 between ramps 116 and 118) to continue rotation of shaft 102 in direction CD2 by rolling rollers 110 along ramps 112. Momentum caused by rotation of shaft 102 in direction CD2 carries rollers 110 past respective apexes and the indeterminate position shown in FIG. 4.

As an example, assume from the configuration of FIGS. 1 and 4, it is desired to rotate shaft 102 in direction CD1, which requires rolling rollers 110 along ramps 114. As an example strategy for initiating operation of motor 100 from the indeterminate position of FIG. 4, encoder E is connected to shaft 102 to measure position and rotation of shaft 102 and ramps 112, 114, 116, and 118 with respect to plate 108 and rollers 110. Device 104 is activated and rollers 110 will either roll along ramps 112 or ramps 114. If the encoder detects rotation of shaft 102 in direction CD1 (rollers 110 rolling on ramps 114), device 120 is activated at the proper time (for example as rollers 110 approach apexes 130 between ramps 116 and 118) to continue rotation of shaft 102 in direction CD1 by rolling rollers 110 along ramps 116. Momentum caused by rotation of shaft 102 in direction CD1 carries rollers 110 past respective apexes 130 and the indeterminate position shown in FIG. 4.

If the encoder detects rotation of shaft 102 in direction CD2 (rollers 110 rolling along ramps 112), device 120 is activated to roll rollers along ramps 116 and reverse rotation of shaft 102 in direction CD2. Device 104 is activated at the proper time (for example before rollers 110 approach apexes 130 between ramps 112 and 114) to continue rotation of shaft 102 in direction CD1 by rolling rollers 110 along ramps 114. Momentum caused by rotation of shaft 102 in direction CD1 carries rollers 110 past respective apexes 130 and the indeterminate position shown in FIG. 4.

The strategy described above for ramps 112 and 114 and rotation of shaft 102 in direction CD1 or CD2 is applicable to displacement of plate 108 in direction AD2 and ramps 116 and 118.

Motor 100 includes housing 132. In an example embodiment: housing 132 includes slot 134; plate 108 includes slot 136; and motor 100 includes ball 138 disposed in slots 134 and 136. Slot 134 is disposed in an axial direction to enable plate 108 to displace in directions AD1 and AD2, with respect to housing 132, for example in response to electrical energization of devices 120 and 104, respectively. At the same time, the presence of ball 138 in slots 134 and 136 prevents plate 108 from rotating in direction CD1 or direction CD2 as plate 108 is displaced in direction AD1 or AD2. Thus, plate 108 cannot rotate to relieve forces F1 and F2, and forces F1 and F2 are reacted against housing 132 to displace plate 108 as described above.

In the example of FIG. 1, air gap 140 is present between core 142 of device 104 and plate 108. In FIG. 1, coil 122 is energized to create magnetic flux 144 through plate 108 and core 146 of device 120. Flux 144 magnetically attracts plate 108 and draws plate 108 into contact with device 120.

In the example of FIG. 5, air gap 148 is present between core 146 of device 120 and plate 108. In FIG. 5, coil 106 is energized to create magnetic flux 150 through plate 108 and core 142 of device 104. Flux 150 magnetically attracts plate 108 and draws plate 108 into contact with device 104.

Gaps 140 and 148 can be maintained at a very low value in manufacturing, for example by pressing in the cores until a measured gap is achieved. This type of gap control is very difficult to do with rotary motors as the air gap is radial and; therefore, require eccentricities to adjust. The low value results in stronger magnetic circuits for device 104 and 120, creating increased motor torque for a given current to devices 104 and 120.

Figure 7:
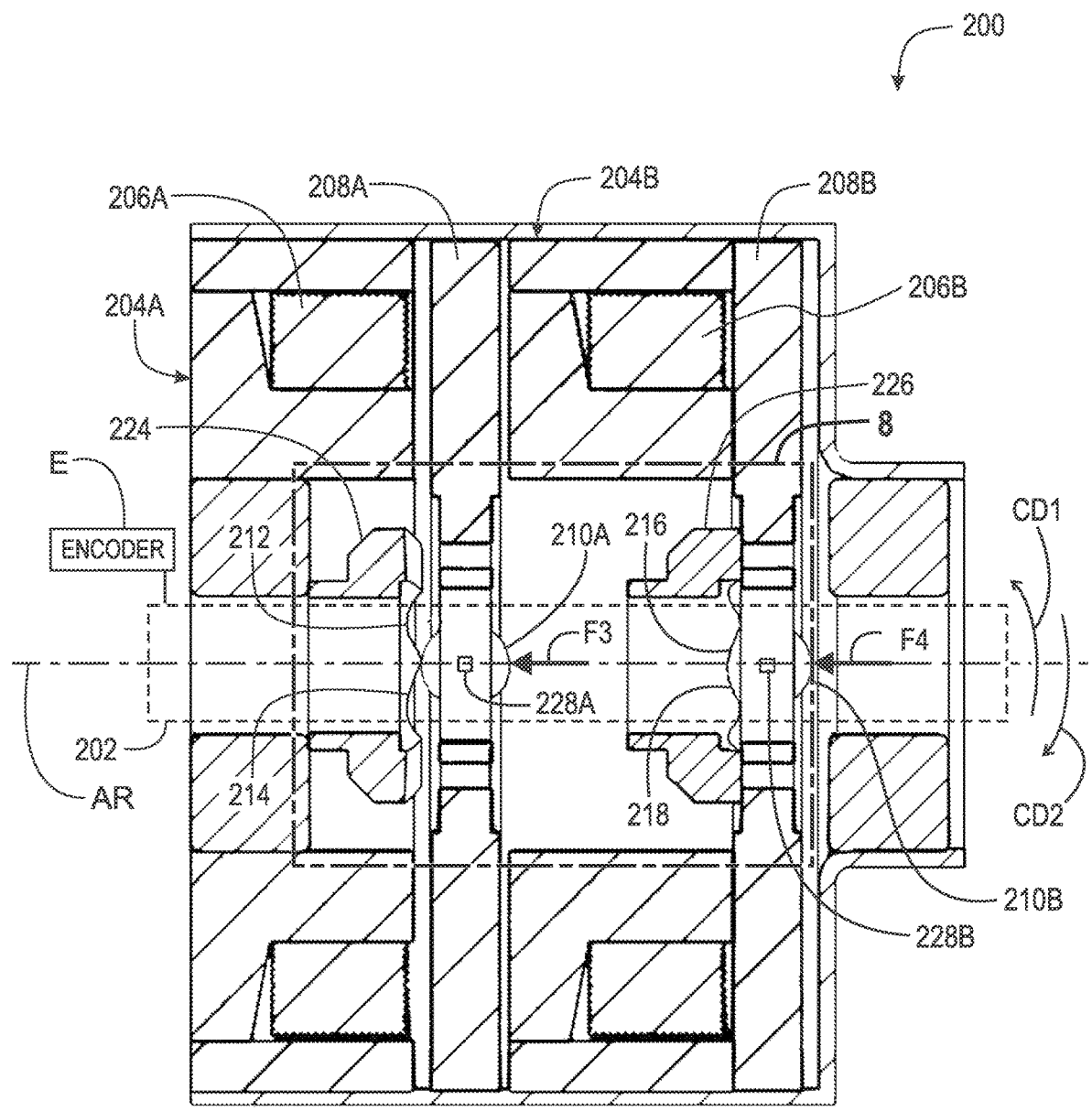
FIG. 7 is a cross-sectional view, from a first side direction, of a reciprocating ramp motor with two core plates in respective first positions.

FIG. 7 is a cross-sectional view, from a first side direction, of reciprocating ramp motor 200 with two annular core plates in respective first positions. Reciprocating ramp motor 200 includes: output shaft 202 (represented in dashed lines) with axis of rotation AR; and electro-magnetic devices 204A and 204B. In an example embodiment, devices 204A and 204B are respective solenoids including coils 206A and 206B, respectively. Motor 200 includes: annular core plates 208A and 208B; roller devices 210A and 210B; and ramps 212, 214, 216, and 218, each fixedly connected to the output shaft. Ramps 212 and 214 alternate in circumferential direction CD1. Ramps 216 and 218 alternate in circumferential direction CD1. Plates 208A and 208B are disposed output shaft 202. Plate 208A is axially off-set from electro-magnetic device 204A in axial direction AD1. Plate 208B is axially off-set from electro-magnetic device 204B in axial direction AD2.

In an example embodiment, motor 200 includes collars 224 and 226 fixedly connected to shaft 202. Ramps 212 and 214 are formed by collar 224 and ramps 216 and 218 are formed by collar 226. Ramps 212 and 218 slope in axial direction AD1 along circumferential direction CD1. Ramps 214 slope and 216 in axial direction AD2 along circumferential direction CD1. Rollers 210A are connected to plate 208A. Rollers 210B are connected to plate 208B. In an example embodiment, each roller 210A is a respective cylindrical disc rotatable about a respective axle 228A fixedly connected to plate 208A. In an example embodiment, each roller 210B is a respective cylindrical disc rotatable about a respective axle 228B fixedly connected to plate 208B.

The operation of motor 200 is similar to the operation of motor 100. A primary difference between motors 100 and 200 is that to displace roller devices along ramps non-rotatably connected to an output shaft to rotate the output shaft: motor 100 uses two electro-magnetic devices (104 and 120) to displace a single core plate (plate 108) in direction AD1 or AD2; and motor 200 uses one electro-magnetic device (204A) to displace one annular core plate (208A) in direction AD2 and a second electro-magnetic device (204B) to displace a second annular core plate (208B) in direction AD2. Thus: the operation of device 204A, plate 208A, rollers 210A, and ramps 212 and 214 in motor 200 rotate shaft 202 in a manner similar to that of device 104, plate 108, rollers 110, and ramps 112 and 114 in motor 100; and the operation of device 204B, plate 208B, rollers 210B, and ramps 216 and 218 in motor 200 rotate shaft 202 in a manner similar to that of device 104, plate 108, rollers 110, and ramps 116 and 118 in motor 100.

The configuration of plates 208A and 208B in FIG. 7 is analogous to the configuration of plate 108 in FIGS. 1 and 4. For example, coil 206A is arranged to be electrically energized to displace core plate 208A in axial direction AD2 from the position shown in FIG. 7. Displacement of core plate 208A in direction AD2 rolls roller devices 210A along respective ramps 212 or 214 in axial direction AD2. Displacement of roller devices 210A along ramps 212 in axial direction AD2 rotates collar 224 and output shaft 202 in circumferential direction CD1. Displacement of roller devices 210A along ramps 214 in axial direction AD2 rotates output shaft 202 in circumferential direction CD2.

For example, displacement of plate 208A in direction AD1, imposes force F3 in direction AD2 on axles 228A. To relieve force F3, rollers 210A roll along ramps 212. Because ramps 212 are sloped in direction AD2 along direction CD1, rolling rollers 210 along ramps 212 forces shaft 202 to rotate in direction CD1. For example, displacement of plate 208A in direction AD2, imposes force F3 in direction AD2 on axles 228A. To relieve force F3, rollers 210A roll along ramps 214. Because ramps 214 are sloped in direction AD2 along direction CD1, rolling rollers 210A along ramps 214 forces shaft 202 to rotate in direction CD2.

Figure 8:
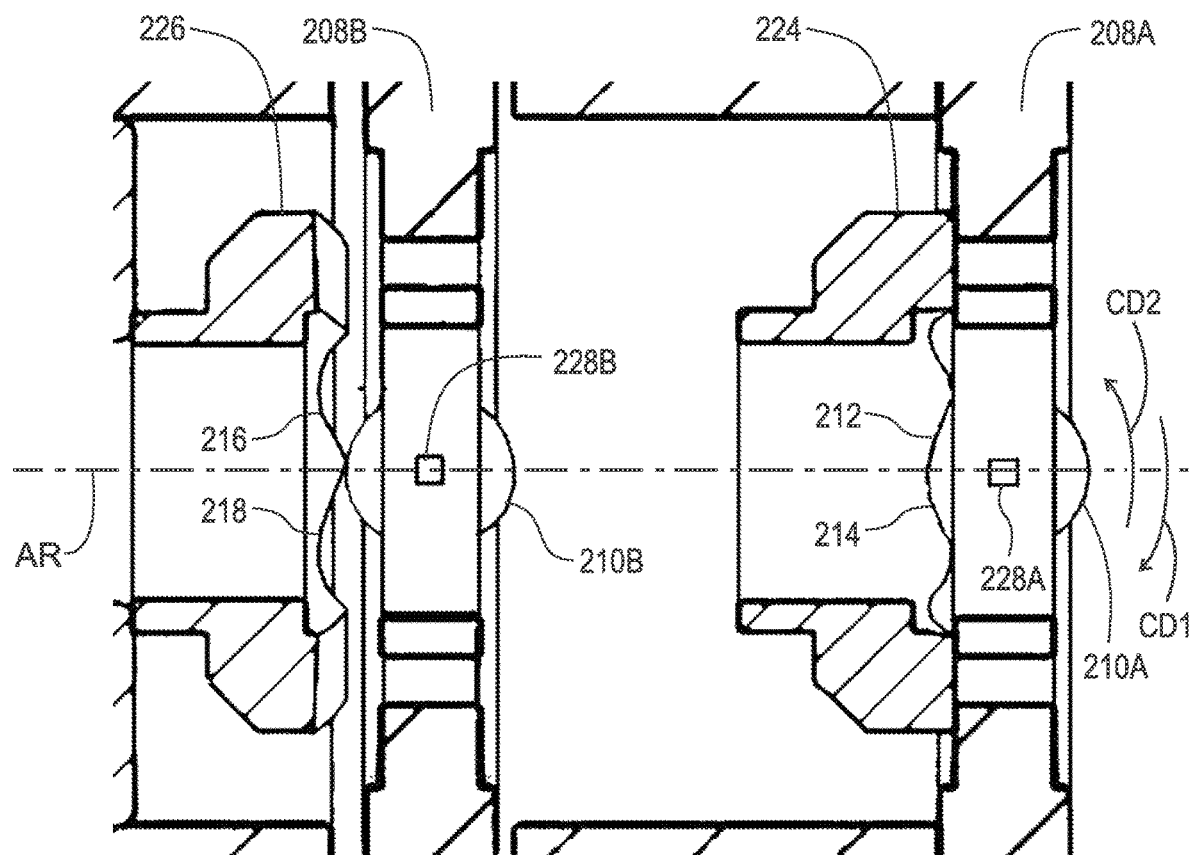
FIG. 8 is a view of area 8 in FIG. 7 from a second opposite side direction; and, FIG. 9 is a perspective view of a cylindrical coordinate system demonstrating spatial terminology used in the present application.

FIG. 8 is a view of area 8 in FIG. 7 from a second opposite side direction. The following should be viewed in light of FIGS. 7 and 8. In an example embodiment, displacing plate 208A in direction AD1 from the configuration of FIG. 7 results in the configuration shown in FIG. 8. The configuration of plates 208A and 208B in FIG. 8 is analogous to the configuration of plate 108 in FIGS. 5 and 6. For example, coil 206B is arranged to be electrically energized to displace core plate 208B in axial direction AD2 from the position shown in FIG. 8. Displacement of core plate 208B in direction AD2 rolls roller devices 210B along respective ramps 216 or 218 in axial direction AD2. Displacement of roller devices 210B along ramps 218 in axial direction AD2 rotates collar 224 and output shaft 202 in circumferential direction CD1. Displacement of roller devices 210B along ramps 216 in axial direction AD2 rotates output shaft 202 in circumferential direction CD2.

For example, displacement of plate 208B in direction AD2 imposes force F4 in direction AD2 on axles 228B. To relieve force F4, rollers 210B roll along ramps 218. Because ramps 218 are sloped in direction AD1 along direction CD1, rolling rollers 210 along ramps 218 forces shaft 202 to rotate in direction CD1. For example, displacement of plate 208B in direction AD2, imposes force F4 in direction AD2 on axles 228B. To relieve force F4, rollers 210B roll along ramps 216. Because ramps 216 are sloped in direction AD2 along direction CD1, rolling rollers 210B along ramps 216 forces shaft 202 to rotate in direction CD2.

Rollers 210A and 210B are in determinate positions in FIGS. 7 and 8. The discussion for motor 100 regarding the use of encoder E in example strategies for initiating operation of motor 100 from the indeterminate positions of FIGS. 4 and 6 is applicable to operation of motor 200 from the indeterminate positions of FIGS. 7 and 8.

Motor 200 includes housing 232. In an example embodiment (not shown): housing 232 includes a slot; plates 208A and 208B include respective slots; and motor 200 includes a ball disposed in the slot in housing 232 and in the slots in plates 208A and 208B. The slot in housing 232 is disposed in an axial direction to enable plates 208A and 208B to displace in directions AD1 and AD2, with respect to housing 232, for example in response to electrical energization of devices 204A and 204B. At the same time, the presence of the ball in the slot in housing 232 and in the slots in plates 208A and 208B prevents plates 208A and 208B from rotating in direction CD1 or direction CD2 as plates 208A and 208B are displaced in direction AD1 or AD2. Thus, plates 208A and 208B cannot rotate to relieve forces F3 and F4, and forces F3 and F4 are reacted against housing 232 to displace plates 208A and 208B as described above.

The discussion for FIGS. 1 and 5 regarding air gaps and magnetic flux is applicable to FIGS. 7 and 8.

Although in FIGS. 7 and 8, plates 208A and 208B are axially off-set from devices 204A and 204B, respectively, in direction AD2, it should be understood that the configuration of motor 200 can be modified such that plates 208A and 208B are axially off-set from devices 204A and 204B, respectively, in direction AD1.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE CHARACTERS 10 cylindrical system
11 axis of rotation
AD1 axial direction
AD2 axial direction
RD1 radial direction
RD2 radial direction
CD1 circumferential direction
CD2 circumferential direction
R radius
12 object
13 object
14 object
15A surface
15B surface
15C edge
16A surface
16B edge
17A radius
17B radius
18 surface
19 circumference
20 radius
100 reciprocating ramp motor
102 output shaft
104 electro-magnetic device
106 coil
108 core plate
110 roller device
112 ramp
112A ramp
114 ramp
114A ramp
116 ramp
116A ramp
118 ramp
118A ramp
120 electro-magnetic device
122 coil
124 collar
126 collar
128 axle
130 apex
132 housing
134 slot
136 slot
138 ball
140 air gap
142 core of device 104
144 magnetic flux
146 core of device 120
148 air gap
150 magnetic flux
200 reciprocating ramp motor
202 output shaft
204A electro-magnetic device
204B electro-magnetic device
206A coil
206B coil
208A core plate
208B core plate
210A roller device
210B roller device
212 ramp
214 ramp
216 ramp
218 ramp
224 collar
226 collar
228 axle
232 housing

The invention claimed is:

1. A reciprocating ramp motor, comprising:
an output shaft including an axis of rotation;
a first electro-magnetic device;
a first annular core plate disposed about the output shaft and axially off-set from the first electro-magnetic device;
a first roller device; and,
a first ramp:
non-rotatably connected to the output shaft; and,
sloping in a first axial direction along a first circumferential direction, wherein:
the first electro-magnetic device is arranged to be electrically energized at a first point in time to displace the first annular core plate in the first axial direction; and,
displacement of the first annular core plate in the first axial direction is arranged to roll the first roller device along the first ramp in the first axial direction to rotate the output shaft in a second circumferential direction, opposite the first circumferential direction.

2. The reciprocating ramp motor of claim 1, further comprising:
a second ramp:
non-rotatably connected to the output shaft; and,
sloping in a second axial direction, opposite the first axial direction, along the first circumferential direction, wherein:
the first electro-magnetic device is arranged to be electrically energized at a second point in time, different from the first point in time, to displace the first annular core plate in the first axial direction; and,
displacement of the first annular core plate in the first axial direction is arranged to roll the first roller device along the second ramp in the first axial direction to rotate the output shaft in the first circumferential direction.

3. A method of using the reciprocating ramp motor of claim 2, comprising:
electrically energizing the first electro-mechanical device at the second point in time;
displacing the first annular core plate in the first axial direction;

rolling the first roller device along the second ramp in the first axial direction; and,
rotating the output shaft in the first circumferential direction.

4. The reciprocating ramp motor of claim 2, wherein:
the first ramp includes a first surface orthogonal to the axis of rotation;
the second ramp includes a second surface orthogonal to the axis of rotation; and,
the first roller device is arranged to roll along the first or second surface.

5. The reciprocating ramp motor of claim 4, further comprising:
a collar:
fixedly connected to the output shaft; and,
including the first and second ramps.

6. The reciprocating ramp motor of claim 1, further comprising:
a second electro-magnetic device; and,
a second ramp:
non-rotatably connected to the output shaft; and,
sloping in a second axial direction, opposite the first axial direction, along the first circumferential direction, wherein:
the first annular core plate is axially disposed between the first and second electro-magnetic devices;
the second electro-magnetic device is arranged to be electrically energized at a second point in time, different from the first point in time, to displace the first annular core plate in the second axial direction; and,
displacement of the first annular core plate in the second axial direction is arranged to roll the first roller device along the second ramp in the second axial direction to rotate the output shaft in the second circumferential direction.

7. The reciprocating ramp motor of claim 6, further comprising:
a third ramp:
non-rotatably connected to the output shaft; and,
sloping in the first axial direction along the first circumferential direction, wherein:
the second electro-magnetic device is arranged to be electrically energized at a third point in time, different from the first and second points in time, to displace the first annular core plate in the second axial direction; and,
displacement of the first annular core plate in the second axial direction is arranged to roll the first roller device along the third ramp in the second axial direction to rotate the output shaft in the first circumferential direction.

8. The reciprocating ramp motor of claim 7, further comprising:
a first collar:
fixedly connected to the output shaft; and,
including the first ramp; and,
a second collar:
fixedly connected to the output shaft;
axially off-set from the first collar; and,
including the second and third ramps.

9. A method of using the reciprocating ramp motor of claim 6, comprising:
electrically energizing the second electro-mechanical device at the second point in time;
displacing the first annular core plate in the second axial direction;

rolling the first roller device along the second ramp in the second axial direction; and,
rotating the output shaft in the second circumferential direction.

10. The reciprocating ramp motor of claim 1, wherein the first annular core plate is non-rotatable about the axis of rotation.

11. The reciprocating ramp motor of claim 1, further comprising:
a second electro-magnetic device;
a second annular core plate;
a second roller device; and,
a second ramp:
non-rotatably connected to the output shaft; and,
sloping in the first axial direction along the first circumferential direction, wherein:
the second electro-magnetic device is arranged to be electrically energized at a second point in time, different from the first point in time, to displace the second annular core plate in the first axial direction; and,
displacement of the second annular core plate in the first axial direction is arranged to roll the second roller device along the second ramp in the first axial direction to rotate the output shaft in the second circumferential direction.

12. The reciprocating ramp motor of claim 11, further comprising:
a third ramp:
non-rotatably connected to the output shaft; and,
sloping in a second axial direction, opposite the first axial direction, along the first circumferential direction, wherein:
the second coil is arranged to be electrically energized at a third point in time, different from the first and second points in time, to displace the second annular core plate in the first axial direction; and,
displacement of the second annular core plate in the first axial direction is arranged to roll the second roller device along the third ramp in the first axial direction to rotate the output shaft in the first circumferential direction.

13. A method of using the reciprocating ramp motor of claim 11, comprising:
electrically energizing the second electro-magnetic device at the second point in time;
displacing the second annular core plate in the first axial direction;
rolling the second roller device along the second ramp in the first axial direction; and,
rotating the output shaft in the second circumferential direction.

14. A method of using the reciprocating ramp motor of claim 1, comprising:
electrically energizing the first electro-mechanical device at the first point in time;
displacing the first annular core plate in the first axial direction;
rolling the first roller device along the first ramp in the first axial direction; and,
rotating the output shaft in the second circumferential direction.

15. A reciprocating ramp motor, comprising:
an output shaft including an axis of rotation;
a first electro-magnetic device including a first coil;
a second electro-magnetic device including a second coil;

an annular core plate disposed about the output shaft and axially disposed between the first and second electro-magnetic devices;
a plurality of roller devices connected to the annular core plate;
a first collar fixedly connected to the output shaft and including:
a first plurality of ramps sloping in the first axial direction along a first circumferential direction; and,
a second plurality of second ramps sloping in a second axial direction, opposite the first axial direction, along the first circumferential direction; and,
a second collar fixedly connected to the output shaft and including:
a third plurality of ramps sloping in the second axial direction along the first circumferential direction; and,
a fourth plurality of ramps sloping in the first axial direction along the first circumferential direction, wherein:
the first coil is arranged to be electrically energized at a first point in time to displace the annular core plate in the first axial direction to:
roll the plurality of roller devices along the first plurality of ramps in the first axial direction to rotate the output shaft in a second circumferential direction, opposite the first circumferential direction; or,
roll the plurality of roller devices along the second plurality of ramps in the first axial direction to rotate the output shaft in the first circumferential direction; and,
the second coil is arranged to be electrically energized at a second point in time, different from the first point in time, to displace the annular core plate in the second axial direction to:
roll the plurality of roller devices along the third plurality of ramps in the second axial direction to rotate the output shaft in the second circumferential direction; or,
roll the plurality of roller devices along the fourth plurality of ramps in the first axial direction to rotate the output shaft in the first circumferential direction.

16. The reciprocating ramp motor of claim 15, wherein:
a first line, parallel to the axis of rotation, passes through the first and fourth pluralities of ramps without passing through the second plurality of ramps or the third plurality of ramps;
a second line, parallel to the axis of rotation, passes through the second and third pluralities of ramps without passing through the first plurality of ramps or the fourth plurality of ramps.

17. A method of using the reciprocating ramp motor of claim 15, comprising:
electrically energizing the first coil at the first point in time;
displacing the annular core plate in the first axial direction;
rolling the plurality of roller devices along:
the first plurality of ramps in the first axial direction and rotating the output shaft in the second circumferential direction; or,
the second plurality of ramps in the first axial direction and rotating the output shaft in the first circumferential direction;
electrically energizing the second coil at the second point in time;
displacing the annular core plate in the second axial direction; and,
rolling the plurality of roller devices along:
the third plurality of ramps in the second axial direction and rotating the output shaft in the second circumferential direction; or,
the fourth plurality of ramps in the second axial direction and rotating the output shaft in the first circumferential direction.

18. A reciprocating ramp motor, comprising:
an output shaft including an axis of rotation;
a first electro-magnetic device;
a second electro-magnetic device;
a first annular core plate disposed about the output shaft;
a second annular core plate disposed about the output shaft;
a first plurality of roller devices connected to the first annular core plate;
a second plurality of roller devices connected to the second annular core plate;
a first collar fixedly connected to the output shaft and including:
a first plurality of ramps sloping in a first axial direction along a first circumferential direction; and,
a second plurality of second ramps sloping in a second axial direction, opposite the first axial direction, along the first circumferential direction; and,
a second collar fixedly connected to the output shaft and including:
a third plurality of ramps sloping in the first axial direction along the first circumferential direction; and,
a fourth plurality of ramps sloping in the second axial direction along the first circumferential direction, wherein:
the first coil is arranged to be electrically energized at a first point in time to displace the first annular core plate in the first axial direction to:
roll the first plurality of roller devices along the first plurality of ramps in the first axial direction to rotate the output shaft in a second circumferential direction, opposite the first circumferential direction; or,
roll the first plurality of roller devices along the second plurality of ramps in the first axial direction to rotate the output shaft in the first circumferential direction; and,
the second coil is arranged to be electrically energized at a second point in time, different from the first point in time, to displace the second annular core plate in the first axial direction to:
roll the second plurality of roller devices along the third plurality of ramps in the first axial direction to rotate the output shaft in the second circumferential direction; or,
roll the second plurality of roller devices along the fourth plurality of ramps in the first axial direction to rotate the output shaft in the first circumferential direction.

19. The reciprocating ramp motor of claim 18, wherein:
a first line, parallel to the axis of rotation, passes through a first and fourth pluralities of ramps; and,
a second line, parallel to the axis of rotation, passes through the second and third pluralities of ramps.

20. A method of using the reciprocating ramp motor of claim 18, comprising:
electrically energizing the first coil at the first point in time;

displacing the first annular core plate in the first axial direction;

rolling the first plurality of roller devices along:
- the first plurality of ramps in the first axial direction and rotating the output shaft in the second circumferential direction; or,
- the second plurality of ramps in the first axial direction and rotating the output shaft in the first circumferential direction;

electrically energizing the second coil at the second point in time;

displacing the second annular core plate in the first axial direction; and, rolling the second plurality of roller devices along:
- the third plurality of ramps in the first axial direction and rotating the output shaft in the second circumferential direction; or,
- the fourth plurality of ramps in the first axial direction and rotating the output shaft in the first circumferential direction.

\* \* \* \* \*

UNITED STATES PATENT AND TRADEMARK OFFICE
CERTIFICATE OF CORRECTION

PATENT NO. : 10,630,138 B2
APPLICATION NO. : 15/702835
DATED : April 21, 2020
INVENTOR(S) : Jeffrey Hemphill Page 1 of 1

It is certified that error appears in the above-identified patent and that said Letters Patent is hereby corrected as shown below:

In the Claims

Column 12, Line 35, "the second coil" should read --the second electro-magnetic device--

Column 14, Line 61, "a first and fourth" should read --the first and fourth--

Signed and Sealed this
Twenty-eighth Day of July, 2020

Andrei Iancu
*Director of the United States Patent and Trademark Office*